United States Patent [19]

Catelli

[11] Patent Number: 4,968,519
[45] Date of Patent: Nov. 6, 1990

[54] METHOD OF MAKING STERILE COOKED, OR PART-COOKED, PASTA PRODUCTS CONTINUOUSLY

[75] Inventor: Camillo Catelli, Parma, Italy

[73] Assignee: Rossi & Catelli S.p.A., Parma, Italy

[21] Appl. No.: 337,696

[22] Filed: Apr. 13, 1989

[30] Foreign Application Priority Data

Apr. 18, 1988 [IT] Italy .................................. 20241 A/88

[51] Int. Cl.⁵ ............................ A21D 6/00; A23P 1/12
[52] U.S. Cl. ..................................... 426/496; 426/448; 426/451; 426/516; 426/521; 426/557
[58] Field of Search ................ 426/516, 448, 451, 557, 426/521, 496

[56] References Cited

U.S. PATENT DOCUMENTS

| | | | |
|---|---|---|---|
| 3,484,251 | 12/1969 | Lawrence | 426/557 |
| 3,642,489 | 2/1972 | Bartley et al. | 426/69 |
| 4,001,452 | 1/1977 | Williams | 426/516 |
| 4,540,592 | 9/1985 | Myer et al. | 426/451 |

Primary Examiner—Donald E. Czaja
Assistant Examiner—Helen Pratt
Attorney, Agent, or Firm—Sughrue, Mion, Zinn, MacPeak & Seas

[57] ABSTRACT

A method is disclosed wherein a dough, prepared from flour and water, as well as other possible ingredients, is subjected to cooking and sterilization at temperatures in the 90° C. to 170° C. range by processing with saturated steam under a pressure, and then cooled inside an aseptic vacuum pan, in a sterile environment. From this vacuum pan, the dough, as sterilized, cooked, cooled, and brought to a predetermined moisture content level, is conveyed, again in a sterile environment, to a forming unit which delivers selected patterns of pasta for packaging in a sterile environment. The dough is mixed and extruded into thin shapes in the absence of heat prior to cooking and sterilization and is formed into the selected patterns subsequent to being cooled.

9 Claims, 2 Drawing Sheets

METHOD OF MAKING STERILE COOKED, OR PART-COOKED, PASTA PRODUCTS CONTINUOUSLY

BACKGROUND OF THE INVENTION

This invention relates to a method of making sterile cooked, or part-cooked, long-life pasta products continuously on an industrial scale.

In general, in the making of cooked or part-cooked long-life pasta products, it is necessary, on the one side, that the product stability and non-toxicity be ensured throughout its shelf life, and on the other side, that the product physical, organoleptic, and nutritional properties be retained, such that when dressed for immediate consumption, it will compare favorably with a similar traditional product (pasta dish) which has been freshly prepared.

Of these requirements, non-toxicity and long-life preservability are prominent.

To that aim, it is a regular and well-established practice in the art to pre-cook a suitable dough, to form it (e.g. by extrusion through dies yielding macaroni, spaghettis to different sizes and shapes, or by rolling out into a sheet of dough), dry it down to a moisture content below 12.5%, and finally package it into sealed containers.

Since the pasta so obtained is evidently non-sterile, it has been suggested of providing a pre-cooking step by superheated heat for freshly prepared pasta having a moisture content in the 25% to 32% range. However, the sterile condition thus provided for the product is subsequently defeated by the drying and packaging operations.

It has therefore been proposed of packaging the pasta, as freshly prepared, into suitable containers, and then carrying out a heat sterilization step either before or after sealing the containers.

This technique, while providing for a sterile product, is not devoid of some serious drawbacks.

In fact, where heat sterilization is completed prior to the container sealing, despite the latter being immediate, there still exists a risk of losing, or at least significantly lowering, the degree of sterilization imparted to the product. Moreover, the process is of necessity a discontinuous one, and as such, unsuitable for application on an industrial scale.

Where heat sterilization is carried out after sealing the containers, it must be protracted some time at a high temperature level to ensure that a safe sterilizing temperature is also achieved at the package core. Thus, the product is sterilized, but inevitably deprived of those organoleptic and physical properties which are recognized to constitute the discriminating factor in assessing the product quality and its acceptability from the merchandizing standpoint.

Overcoming these and other drawbacks of the prior art is the problem that underlies this invention, the invention being therefore directed to a method of making sterile cooked, or part-cooked, long-life pasta products continuously on an industrial scale, which pasta retains unaltered all the physical, organoleptic, and nutritional characteristics of conventionally made dry pasta.

SUMMARY OF THE INVENTION

This problem is solved, according to the invention, by a method comprising the following steps carried out on a continuous basis:

preparing a dough from flour and water and other possible ingredients, introducing said dough into a cooker-sterilizer wherein a temperature in the 90° C. to 170° C. range is maintained by means of saturated steam;

working said dough into a continuous shape of small thickness immediately on its entering said cooker-sterilizer;

advancing said continuous shape through the cooker-sterilizer, in which it is made to reside for a sufficiently long time period to have it thoroughly heat sterilized and cooked by the saturated steam;

taking the so sterilized and cooked dough out of said cooker-sterilizer and transferring it into an aseptic vacuum pan, while maintaining said dough in a sterile condition;

introducing the dough, as sterilized and cooked, into said aseptic vacuum pan to lower its moisture content down to a predetermined value and at the same time have it cooled;

taking the presently cooled dough out of said vacuum pan to a forming step, while still maintaining it in a sterile condition; and forming said dough into a desired pasta pattern with said pasta held in a sterile environment.

The provision for heat processing with saturated steam at a high pressure a dough which has been reduced to a small thickness, e.g. preferably a thickness varying between 0.2 mm and 2 mm, enables a selected temperature level for optimum sterilization of the dough to be immediately and reliably attained throughout the dough. As a result, full de-activation of the enzymes and wipe-out of the heat-sensitive bacterial charge can be achieved within a short time. In addition, optimum gelling of the amylopectines can be achieved along with optimum cooking of the dough, which will exhibit enhanced homogeneity and firmness properties and have changes of its organoleptic and nutritional properties inhibited.

In accordance with another aspect of this invention, in order to reduce the dough to a continuous shape of small thickness, it is arranged for it to be subjected to drawing or rolling out directly on entering the cooker-sterilizer, to yield a pasta pattern similar to freshly prepared spaghettis or sheet dough, respectively.

Advantageously and in accordance with a further aspect of this invention, the cooker-sterilizer is arranged to extend along an essentially vertical direction, and the continuous dough patterns are fed into said cooker by letting them fall freely therethrough.

BRIEF DESCRIPTION OF THE DRAWINGS

The features and advantages of the invention will become more clearly apparent from the following detailed description of a method embodying it, to be taken in conjunction with the accompanying drawings which show, by way of example and not of limitation, a diagramatic layout of a system for implementing the method wherein.

DETAILED DESCRIPTION OF THE INVENTION

Figure 1:
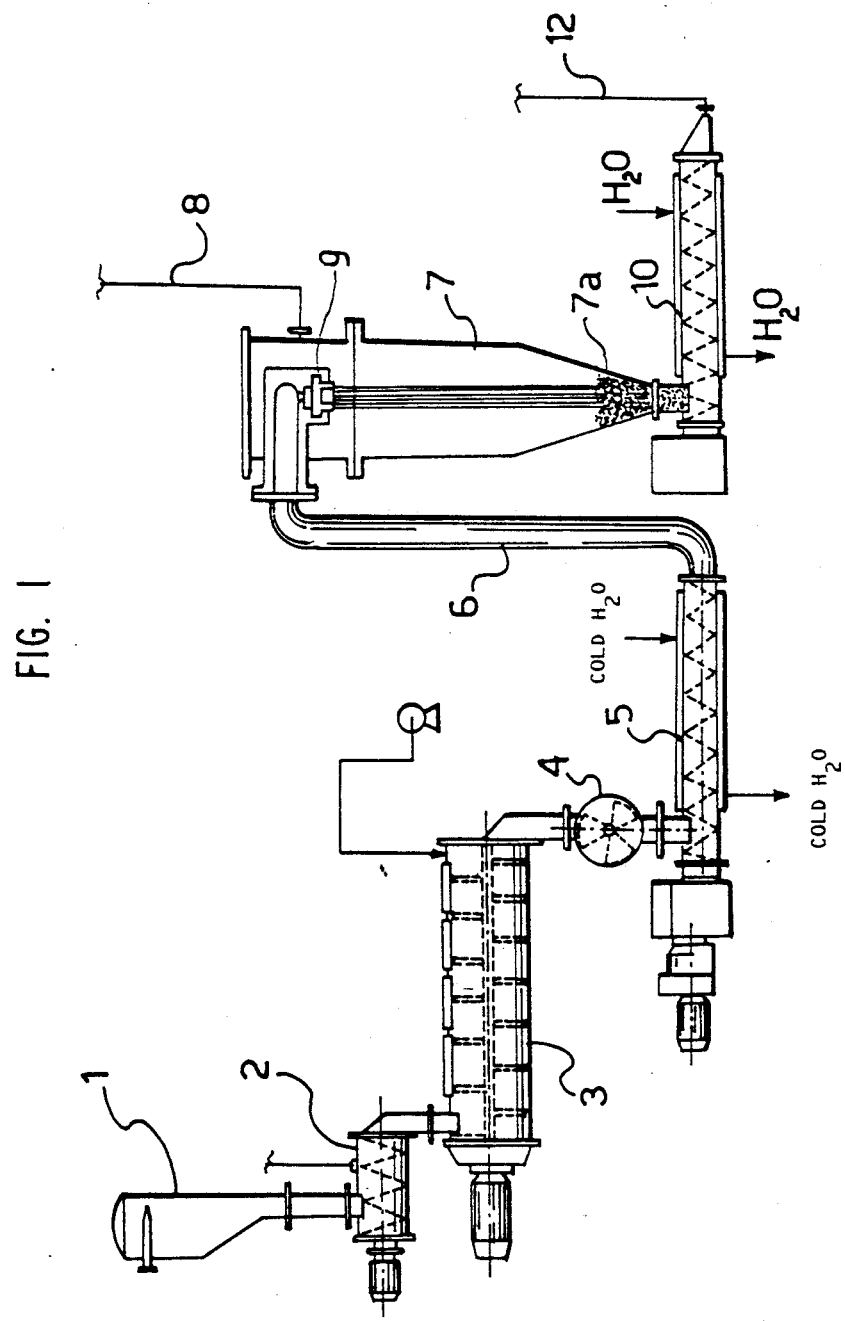
FIG. 1 is a partial diagrammatic view of the system of the present invention showing the first portion of the system.
Figure 2:
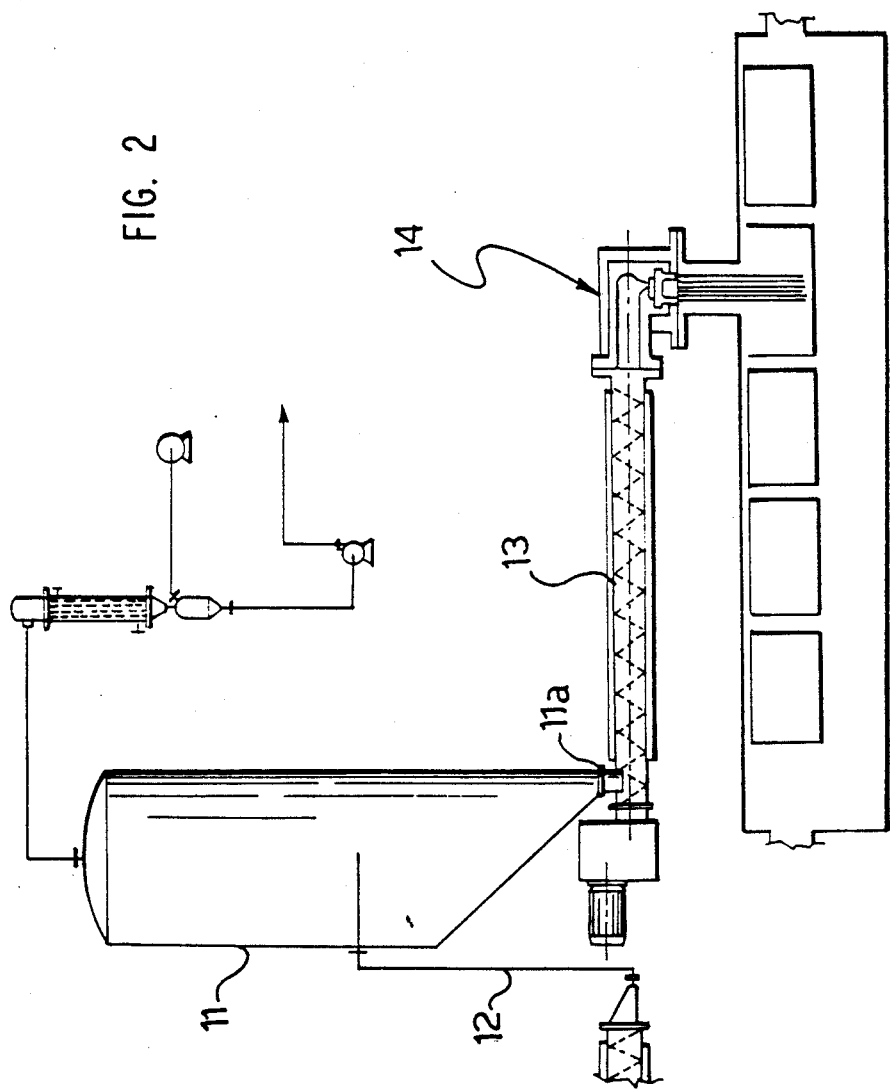
FIG. 2 is a partial diagrammatic view of the system of the present invention showing the last portion of the system.

Separate flows of water, and flour such as wheat flour or similar pulverized ingredient, are conveyed from a silo 1 into a volumetric batcher 2, whence they are passed into a centrifugal mixer 3.

From this mixer 3, wet flour is fed continuously into a kneader 4, from which the resulting dough, which has a moisture content in the 25% to 32% range by weight, is discharged into an auger press 5 suitably cooled to prevent any heating of the dough during its residence therein.

By means of this press 5, the dough, which has been kneaded cold, is urged through a conduit 6 toward a cooker-sterilizer 7 laid out in a mainly vertical direction.

Inside this cooker-sterilizer 7, a temperature of between 90° C. and 170° C. is maintained by means of saturated steam, which is supplied into it over a line 8. The cold dough, or better, the dough at the same temperature that it had within the auger press 5, is fed continuously into the cooker-sterilizer 7, and directly on entering it, said dough is worked into a continuous shape or pattern of small thickness, preferably within the range of 0.2 mm to 2 mm.

For this purpose, at the inlet to the cooker-sterilizer 7, there is mounted, for example, a conventional extruder 9 which is suitably cooled and through which the dough, having substantially the same temperature and moisture content that it had while within the auger press, is extruded continuously in the pattern of plural threads or fresh spaghettis having a diameter of 0.2 to 2 mm. Alternatively, at the inlet to the cooker-sterilizer 7 there may be mounted a rolling apparatus effective to form the dough into a sheet, again having a thickness of 0.2 to 2 mm.

While reduced to such continuous shapes, the dough is fed into the cooker-sterilizer 7 by letting it fall freely therethrough.

Within the cooker-sterilizer 7, the continuous dough shapes or patterns undergo heat sterilization and cooking by saturated steam under a pressure. The residence time within said cooker, the saturated steam temperature, and the reduced thickness selected for the patterns (either spaghettis or sheet) are preset to provide for a uniform and homogeneous optimum sterilization thereof. A large contribution to this important result comes from that the dough has undergone no amount of heating in any way comparable to even the slightest pre-cooking within the auger press. Accordingly, it is highly important that the press 5 and extruder 9 be cooled.

The dough, thus sterilized and cooked, which begins to reformed as a shapeless mass at the bottom 7a of the cooker-sterilizer 7, is fed continuously into the auger press 10, which is kept aseptic and in which it is ultimately cooked to be then taken to an aseptic vacuum pan 11.

The last-mentioned vacuum pan is also laid out mainly in a vertical direction, and the dough is fed continuously thereinto under the urge from the auger press 10 via a conduit 12.

Directly on entering the aseptic vacuum pan 11, the dough is worked into a continuous shape or pattern having a reduced thickness of 0.2 to 2 mm, in exactly the same manner as on entering the cooker-sterilizer 7.

Here too the continuous pattern may be obtained through the use of an extruder or a rolling apparatus.

Within the aseptic vacuum pan 11, excess moisture is removed from the continuous dough patterns (either spaghettis or a sheet), as absorbed during the sterilization step, and such patterns are cooled at the same time. By control of the amount of the vacuum within the vacuum pan 11, the amount of residual moisture can be controlled in the product to be discharged from said vacuum pan.

The bottom end 11a of the aseptic vacuum pan 11 opens to an aseptic auger press 13, into which the dough which has reformed as a shapeless mass at the bottom of the vacuum pan is discharged continuously.

Within the aseptic press 13, the dough, now sterilized, cooked, cooled, and reduced to a set moisture content, undergo final kneading while being urged toward a forming unit 14, also kept aseptic. The latter unit may comprise a conventional extruder or a rolling apparatus, from which the various patterns or types of long or short pasta are delivered either by extrusion or rolling out in a sterile and cold condition at a predetermined moisture content. The extrusion or rolling takes place in a sterile environment, and in a sterile environment is also carried out the successive step of packaging the pasta products (e.g. spaghettis, noodles, lasagne, short cut pasta such as various macaroni sizes, including small sizes for pasta soups) inside sterilized containers.

I claim:

1. A method of making sterile cooked, or part-cooked, long life pasta products on a continuous basis, comprising the following steps carried out on a continuous basis:

preparing a dough from ingredients comprising flour and water;

introducing said dough into a cooker-sterilizer wherein a temperature in the 90° C. to 170° C. range is maintained by means of saturated steam;

working said dough into at least one continuous shape having a thickness of from 0.2 to 2.00 mm immediately upon introduction of said dough into said cooker-sterilizer;

advancing said at least one continuous shape through the cooker-sterilizer while maintaining said shape in said cooker-sterilizer for a sufficiently long time period to have said at least one shape thoroughly heat sterilized and cooked by the saturated steam;

removing said sterilized and cooked dough from said cooker-sterilizer and transferring said sterilized and cooked dough to an aseptic vacuum pan, while maintaining said dough in a sterile condition;

introducing said sterilized and cooked dough into said aseptic vacuum pan;

removing excess moisture content from said sterilized and cooked dough absorbed during said sterilization step while simultaneously cooling said dough;

removing the cooled dough from said vacuum pan; and transferring said cooled dough to a forming means while still maintaining said cooled dough in a sterile condition; and forming said cooled dough into a desired pasta shape in a sterile environment.

2. A method according to claim 1, further comprising maintaining said dough at ambient temperature prior to introduction into said cooker-sterilizer.

3. A method according to claim 2, further comprising extruding said dough at ambient temperature as it is being introduced into said cooker-sterilizer to obtain said at least on continuous shape.

4. A method according to claim 1, wherein said cooker-sterilizer is disposed in a substantially vertical direction whereby said at least one continuous shape is permitted to fall freely through the cooker-sterilizer.

5. A method according to claim 1, further comprising re-forming said dough from said at least one continuous shape into a shapeless mass prior to removing said sterilized and cooked dough from said cooker-sterilizer.

6. A method according to claim 5, wherein said sterilized and cooked dough is worked into at least one continuous shape of reduced thickness upon introduction into said aseptic vacuum pan.

7. A method according to claim 6, further comprising re-forming said dough from said at least one continuous shape having reduced thickness into a shapeless mass of dough and subjecting said shapeless mass of dough to additional kneading during transfer to said forming means.

8. A method according to claim 1, further comprising subjecting the initially prepared dough to cold kneading prior to introduction into said cooker-sterilizer.

9. A method according to claim 1, further comprising packaging the dough having the desired pasta shape in sterilized containers in a sterilized environment.

* * * * *